(12) United States Patent
Hikmet

(10) Patent No.: US 6,558,840 B1
(45) Date of Patent: May 6, 2003

(54) ELECTRODE FOR USE IN A NON-AQUEOUS BATTERY

(75) Inventor: Rifat A. M. Hikmet, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/534,218

(22) Filed: Mar. 24, 2000

(30) Foreign Application Priority Data

Mar. 31, 1999 (EP) ............................................. 99201023

(51) Int. Cl.[7] .......................... H01M 4/60; H01M 4/62; H01M 4/58
(52) U.S. Cl. ...................... 429/212; 429/217; 429/218.1
(58) Field of Search .................................. 429/212, 217, 429/218.1, 231.1–231.3; 428/315.5, 317.9

(56) References Cited

U.S. PATENT DOCUMENTS

| | | | |
|---|---|---|---|
| 3,351,495 A | | 11/1967 | Larsen et al. |
| 3,864,715 A | * | 2/1975 | Mastrangelo ................... 257/1 |
| 4,320,185 A | * | 3/1982 | Bernstein et al. ......... 252/182.1 |
| 4,396,693 A | * | 8/1983 | Bernstein et al. ......... 252/182.1 |
| 4,880,571 A | * | 11/1989 | Comminellis et al. ...... 552/297 |
| 5,143,805 A | | 9/1992 | Anderman et al. .......... 429/217 |
| 5,470,357 A | | 11/1995 | Schmutz et al. ............ 29/623.5 |
| 5,789,108 A | * | 8/1998 | Chu ............................ 429/213 |
| 6,287,723 B1 | * | 9/2001 | Maeda et al. ................ 429/206 |

FOREIGN PATENT DOCUMENTS

| | | | |
|---|---|---|---|
| EP | 0243653 A2 | 11/1987 | ............. H01M/4/02 |
| WO | WO0420995 | 9/1994 | ............. H01M/2/16 |

OTHER PUBLICATIONS

Mohammadi et al., "Use of Polyelectrolyte for Incorporation of Ion–exchange Groups in Composite Membranes for Vanadium Redox Flow Battery Applications", Journal of Power Source, vol. 56, No. 1, Jul. 1995, pp. 91–96.

* cited by examiner

Primary Examiner—M. Alexandra Elve
Assistant Examiner—Zidia Pittman
(74) Attorney, Agent, or Firm—Dicran Halajian

(57) ABSTRACT

Electrode for use in a non-aqueous battery, which electrode comprises at least a microporous sheet, consisting of inorganic, optionally electroconductive particles, a polymer having a high molecular weight, and a hydrocarbon-containing compound. The electrode can be used as a cathode, an anode and a separator in a battery built up of one or more layers of a current collector, an anode, a separator, a cathode, a current collector and an electrolyte, in particular a rechargeable Li-ion battery.

12 Claims, 1 Drawing Sheet

ELECTRODE FOR USE IN A NON-AQUEOUS BATTERY

BACKGROUND OF THE INVENTION

Figure 1:
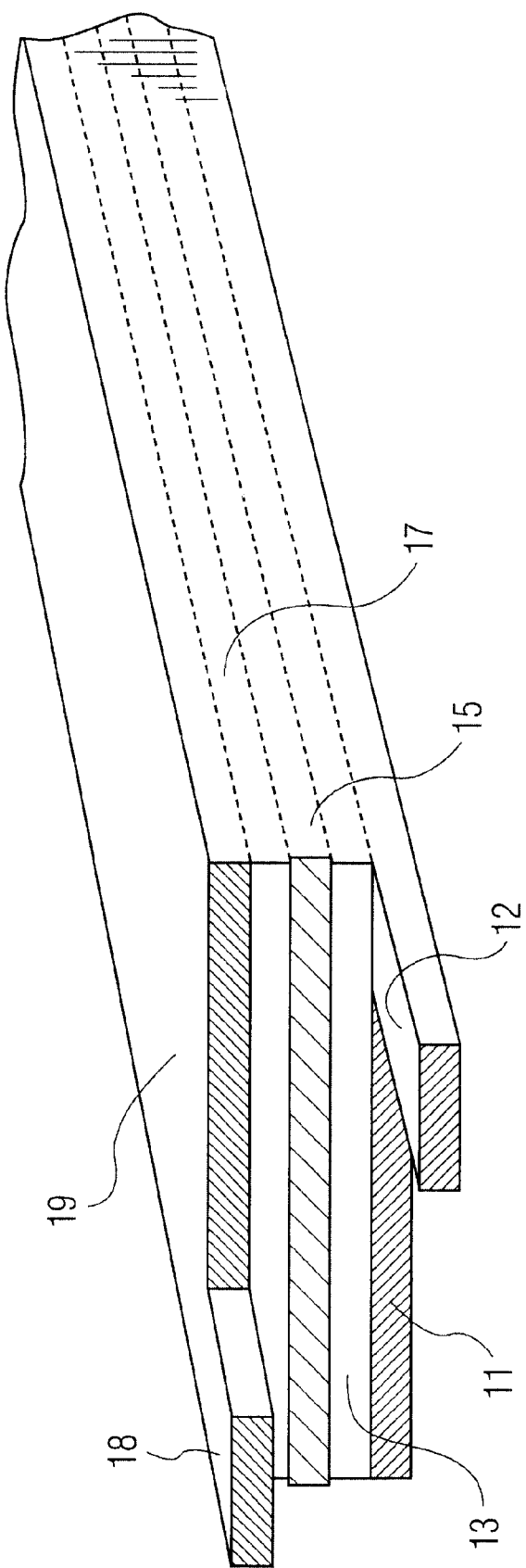

The invention relates to an element, in particular an electrode, for use in a non-aqueous battery, which element comprises at least a microporous sheet consisting of inorganic, optionally electroconductive, particles, a polymer with a high molecular weight and a hydrocarbon-containing compound. The present invention further relates to a method of manufacturing such an element, as well as to the application of such an element as a cathode, an anode and a separator, respectively. The present invention additionally relates to a battery which is successively composed of one or more layers of a current collector, an anode, a separator, a cathode and a current collector.

The element as mentioned in the opening paragraph is known per se from U.S. Pat. No. 5,143,805. The element disclosed therein, in particular a cathode-electrode, comprises a microporous sheet, which is a self-supporting foil composed of an essentially homogeneous composition of approximately 70–98 wt. % electrochemically active and electroconductive particulate material, approximately 2–30 wt. % polyethene having a weight-averaged molecular weight of 150,000 to approximately 5 million, and 0 to approximately 5 wt. % of an organic softening agent for the polyethene, and a current collector which is composed of a conductive material, said collector being in close contact with at least one side of the microporous sheet.

A drawback of such an electrode is the small quantity of inorganic particles in the polymer. The small quantity of inorganic particles reduces the activity of the electrode ultimately obtained. But increasing the quantity of inorganic particles leads, in practice, to a reduction of the integrity of the microporous sheet, and causes the microporous sheet to be susceptible to crack formation and disintegration.

SUMMARY OF THE INVENTION

For this reason, it is an object of the invention to provide an element, in particular an electrode, wherein a substantially larger quantity of inorganic particles can be processed.

Another object of the invention is to provide an element, in particular an electrode, which in spite of the high content of inorganic particles is not susceptible to crack-formation and disintegration.

In accordance with the invention, when the microporous sheet is used for an anode and a separator, the microporous sheet comprises 80–99.9 wt. % inorganic, optionally electroconductive, particles, 0.1–20.0 wt. % polyolefin compound with a high molecular weight, and 0–20.0 wt. % polymer, which polymer swells upon contacting electrolyte. When the microporous sheet is used for a cathode containing a quantity of polyolefin compound with a molecular weight of 0.1–1.9 wt. %, then the microporous sheet comprises 80–99.9 wt. % inorganic, optionally electroconductive, particles and 0–20 wt. % polymer, which polymer swells upon contacting electrolyte. When the microporous sheet is used for a cathode containing a quantity of polyolefin compound with a high molecular weight of 1.9–20 wt. %, then the microporous sheet comprises 80–98 wt. % inorganic, optionally electroconductive, particles and 0.1–20 wt. % polymer, which polymer swells upon contacting electrolyte.

The term cathode as used herein refers to a positive electrode, and the term anode refers to a negative electrode.

For the polyolefin compound having a high molecular weight, use is preferably made of Ultra High Molecular Weight Polyethene (UHMWP) or Ultra High Molecular Weight Polypropene (UHMWPP) having a weight-averaged molecular weight in the range from 1–10 million.

This polyolefin compound, which is used in the present invention, may additionally be composed of a mixture of polyethene having a high molecular weight and polyethene having a low molecular weight. It is alternatively possible, however, to use a mixture of polyethene with a high molecular weight and polypropene with a high molecular weight. Such a mixture exhibits a high resistance to high temperatures and a low shrinkage.

To obtain a flexible, electroconductive electrode having a high temperature stability, it is desirable for the polyolefin compound to be cross-linked. Cross-linking can be brought about by using ionizing radiation, electron radiation or K-radiation.

The quantity of polymer, which polymer exhibits swelling after contact with electrolyte, preferably ranges from 0.1 to 5 wt. % and is preferably chosen from the group formed by polystyrene, polyethene oxide, polypropene oxide, The element in accordance with the invention can suitably be used as a cathode. When the element is used as a cathode, use is preferably made of inorganic particles, such as particles selected from the group consisting of 3d-transition metal oxides, such as $LiMn_2O_4$, $LiCoO_2$, $LiNiO_2$, to which, optionally, electroconductive particles, such as carbon and/or metal, are added.

The relevant element can also suitably be used as an anode. If the relevant element is used as an anode, preferably, carbon and/or graphite are used for the inorganic, electroconductive particles.

The relevant element can also suitably be used as a separator. If the relevant element is used as a separator, use is preferably made of inorganic, non-electrical particles, which particles are preferably selected from ceramic materials and/or oxides. For the ceramic material use is preferably made of $Li_{(1+x)}Al_xTi_{(2-x)}(PO_4)_3$ and/or $Li_{3x}La_{(2/3-x)}TiO_3$. For the oxides, use can suitably be made of $Al_2O_3$ and/or $SiO_2$.

The present invention further relates to a battery composed of one or more layers of a current collector, an anode, a separator, a cathode and a current collector, wherein at least one of the components: cathode, anode and separator, is the above-described cathode, anode and separator.

The present invention further relates to a method of manufacturing an element as described hereinabove, wherein the starting materials, namely inorganic, optionally electroconductive, particles, polyolefin compound and polymer are mixed with a solvent, whereupon the resultant mixture is supplied to an extruder so as to form a foil, after which the solvent is removed from the foil to obtain a microporous sheet.

In accordance with the method of the invention, an anode, a cathode and a separator can be manufactured in this manner. If a separator is manufactured, ceramic particles are used, as described hereinabove.

The element thus obtained can subsequently be used to manufacture lithium-ion batteries. The manufacturing process may be carried out in a number of different ways. The anode and the cathode can be laminated with current collectors by heating under pressure. This may be carried out in the dry state or in the presence of a solvent, which is subsequently removed from the system. In this way, composite sheets of, successively, a current collector/an anode/a separator/a cathode/a current collector are manufactured.

It is alternatively possible to jointly subject the anode and the cathode as well as the separator to a co-extrusion treatment. The resultant, composite element can be subsequently provided with current collectors and arranged to manufacture a battery.

It is also possible to subject either the anode or the cathode with the separator to a co-extrusion treatment. The resultant composite sheet material can be subsequently provided with current collectors and arranged to manufacture a battery.

In accordance with yet another method, both the anode and the cathode are provided, during the manufacture thereof, with a current collector. These self-supporting sheet materials may be subsequently combined with a conventional separator to manufacture a battery.

The systems described hereinabove may be finally provided with an organic ion-conducting liquid to obtain the final batteries. The present invention will be explained by means of a number of examples, which examples should not be construed as limiting the scope of the present invention.

Manufacture of an Anode

A mixture of 5.3 g meso-carbon micro-grains, 5 g decalin and 0.05 g UHMWPE having a molecular weight above 1 million were prepared. The mixture was dissolved in an inert solvent and a film was prepared. After the excess solvent was removed, the film was subjected to a rolling operation to obtain a microporous sheet.

Manufacture of a Cathode

The cathode was manufactured in a similar way as the anode, with the exception that first a mixture of 5 g $LiCoO_2$, 5 g decalin, 0.05 g UHMWPE with a molecular weight above 1 million and 0.3 g soot was prepared. The mixture was subsequently dissolved in an inert solvent and treated in a similar way as the anode. After removing the solvent, dry microporous sheets were obtained. Experiments have shown that the modulus of the sheets increases as the polymer content increases.

Manufacture of a Separator

A separator was manufactured using 1 g UHMWPE having a molecular weight above 1 million and 9 g $Li_{0.55}La_{0.35}TiO_3$ particles having a particle size of approximately 1 Tm. Both starting materials were dissolved in decalin whereafter a porous polymer film was formed. The conductivity at room temperature of such a film comprising 1 mol % $LiPF_6$ in propene carbonate solution was found to be 1.2 mS/cm.

Manufacture of a Battery

Using a copper current collector for the anode and an aluminum current collector for the cathode, a battery was manufactured consisting of alternate anode, cathode and separator layers. The battery was subsequently immersed in 1 mol $LiPF_6$ in a EC:DEC 1:1 solution. Subsequently, the battery was provided in an aluminium-laminated synthetic resin holder. The battery could be charged without any external pressure being necessary.

FIG. 1 shows a battery according to the invention, which includes a copper collector 11 with a terminal 12, an anode 13, separator 15, cathode 17, and aluminum collector 19 with terminal 18.

What is claimed is:

1. An electrode for use in a non-aqueous battery, which electrode comprises a microporous sheet, said microporous sheet consisting essentially of 80–99.8 wt. % inorganic particles, 0.1–20.0 wt. % high molecular weight polyolefin compound and 0.1–5.0 wt. % polymer, which polymer swells upon contacting electrolyte, wherein the polymer which swells upon contacting electrolyte is selected from the group consisting of polystyrene, polyethene oxide, polypropene oxide, polyacrylate, polycarbonate and copolymers thereof.

2. An electrode as claimed in claim 1, wherein the polyolefin compound is UI W-polyethene having a weight-averaged molecular weight in the range from 1 to 10 million.

3. An electrode as claimed in claim 1, wherein the polyolefin compound is UHMW-polypropene having a weight-averaged molecular weight in the range from 1 to 10 million.

4. An electrode as claimed in claim 1, wherein said inorganic particles are electroconductive.

5. An electrode as claimed in claim 1, wherein the electrode is an anode.

6. An electrode as in claim 5 wherein the inorganic particles are selected from the group consisting of carbon and graphite.

7. An electrode for use in a non-aqueous battery, which electrode comprises a microporous sheet, said microporous sheet consisting essentially of 80–99.8 wt. % inorganic particles, 0.1–20.0 wt. % high molecular weight polyolefin compound and 0.1–5.0 wt. % polymer, which polymer swells upon contacting electrolyte, wherein the polyolefin compound is cross-linked.

8. An electrode as claimed in claim 7, wherein the polyolefin compound is UHMW-polyethene having a weight-averaged molecular weight in the range from 1 to 10 million.

9. An electrode as claimed in claim 7, wherein the polyolefin compound is UHMW-polypropene having a weight-averaged molecular weight in the range from 1 to 10 million.

10. An electrode as claimed in claim 7, wherein said inorganic particles are electroconductive.

11. An electrode as claimed in claim 7, wherein the electrode is an anode.

12. An electrode as in claim 11, wherein the inorganic particles are selected from the group consisting of carbon and graphite.

* * * * *